(12) United States Patent
Rau

(10) Patent No.: US 8,362,411 B1
(45) Date of Patent: Jan. 29, 2013

(54) SOLAR TRACKER MOTOR HAVING A FIXED CALIPER AND A TRANSLATING CALIPER EACH WITH AN ELECTROMAGNETIC BRAKE SYSTEM

(75) Inventor: Scott James Rau, Murrieta, CA (US)

(73) Assignee: The Boeing Company, Chicago, IL (US)

(*) Notice: Subject to any disclaimer, the term of this patent is extended or adjusted under 35 U.S.C. 154(b) by 688 days.

(21) Appl. No.: 12/581,997

(22) Filed: Oct. 20, 2009

(51) Int. Cl.
*G01C 21/02* (2006.01)
*H02N 6/00* (2006.01)

(52) U.S. Cl. .................. 250/203.4; 136/246

(58) Field of Classification Search ........... 250/203.4; 136/235, 246; 126/573–577, 584, 594, 600, 126/603, 605–607
See application file for complete search history.

(56) References Cited

U.S. PATENT DOCUMENTS 7,357,132 B2 * 4/2008 Hayden .................. 126/604

OTHER PUBLICATIONS

"Inchworm Motor" Wikipedia.com, Accessed Oct. 19, 2009, 2 pages.
"File: Piezomotor type inchworm.gif" Wikipedia.com, Accessed Oct. 19, 2009, 4 pages.
Circular Electromagnets: 12 & 24 Volt DC Continuous Duty Cycle, AEC Magnetics, Accessed Oct. 19, 2009 from http://www.aecmagnetics.com/cat/Round-12-24-Volt-DC.pdf, 3 pages.

* cited by examiner

*Primary Examiner* — Que T Le
*Assistant Examiner* — Don Williams
(74) *Attorney, Agent, or Firm* — Hope Baldauff Hartman, LLC

(57) ABSTRACT

Concepts and technologies described herein provide for an accurate and cost-effective method for rotating a solar array disk for tracking the movement of the sun. According to various aspects, a motor includes a fixed caliper and a translating caliper positioned adjacent to one another. Electromagnetically controlled brakes on the translating caliper grip the solar array disk while adjacent, but spaced apart, electromagnets on the fixed caliper and the translating caliper are energized to create an attractive force that pulls the translating caliper with the solar array disk toward the fixed caliper. After reaching the fixed caliper, brakes on the fixed caliper are engaged with the disk, brakes on the translating caliper are released from the disk, and the translating caliper is pushed back to the starting location where the process repeats until the desired rotation is completed.

20 Claims, 8 Drawing Sheets

US 8,362,411 B1

SOLAR TRACKER MOTOR HAVING A FIXED CALIPER AND A TRANSLATING CALIPER EACH WITH AN ELECTROMAGNETIC BRAKE SYSTEM

GOVERNMENT RIGHTS

This invention was made with Government support under contract number DE-FC36-07GO17052 awarded by the Department of Energy. The government has certain rights in this invention.

BACKGROUND

Solar arrays may include any number of photovoltaic cells that collect and convert sunlight into electricity. Depending on the application for which any solar array is designed, a solar array may be fixed in place or may track the movement of the sun. As solar technology improves, the size of photovoltaic cells is decreasing. As a result, it is often desirable to closely track the movement of the sun with a solar array in an effort to maximize the focus of the sunlight on the corresponding photovoltaic cells, and therefore maximize the efficiency of the solar array.

Many conventional solar power generators utilize a two-axis solar tracker mechanism ("solar tracker") to track the sun. The first axis is a horizontal axis, or elevation axis, around which the solar tracker rotates the solar array up and down in elevation. The second axis is a vertical axis, or azimuth axis, around which the solar tracker rotates the solar array around in a circle parallel to the ground. Using this two-axis tracking system, the solar tracker can accurately track the sun as it moves across the sky.

A typical solar tracker utilizes an electric motor with one or more associated gear trains and linkages. Because the rotation associated with the solar array is conducted in such fine increments, the gear train that spans from the motor to the axis of rotation can be relatively large, requiring a large gear ratio. These gears can be costly to manufacture. Moreover, the electric motors and associated bearings for supporting the motor shaft require periodic maintenance and replacement, adding to the cost associated with maintaining the solar array.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Concepts and technologies described herein provide for a solar tracker motor that eliminates the conventional gear train and motor bearings, among other corresponding motor components, that may be costly to manufacture and maintain. The disclosure provided herein includes a method for driving a solar array disk in which a brake system of a fixed caliper is disengaged from the solar array disk to release the disk for rotation. A brake system of an adjacent translating caliper is then engaged to clamp the translating caliper to the solar array disk. The translating caliper and the solar array disk are then moved from a starting position spaced apart from the fixed caliper to an end position that abuts the fixed caliper. According to various embodiments, the movement is induced electromagnetically via translation electromagnets attached to the fixed and translating calipers. According to further aspects of the disclosure, the brake system of the translating caliper is then disengaged from the solar array disk, the brake system of the fixed caliper is engaged to secure the disk in place, and the translating caliper is returned to the starting position, where the process may repeat to further rotate the solar array disk.

According to another aspect, a solar tracker motor includes a fixed caliper and a translating caliper. Each caliper may include an electromagnet brake system and a translation electromagnet. The translation electromagnets are spaced a gap width apart that defines the distance that the translating caliper moves the solar array disk when an electrical input is applied to the translation electromagnets to induce attraction and corresponding movement of the translating caliper toward the fixed caliper.

According to one aspect of the disclosure, the electromagnet brake systems include an upper brake pad and a lower brake pad that are configured to grip and apply pressure to opposing sides of the solar array disk. The upper brake pad is attached to an upper moveable electromagnet that is attracted to an upper fixed electromagnet when energized with an electrical input. The induced movement of the upper moveable electromagnet raises the upper brake pad to release the solar array disk for rotation. A lower electromagnet system works similarly to release the lower brake pad from the solar array disk.

The features, functions, and advantages that have been discussed can be achieved independently in various embodiments of the present disclosure or may be combined in yet other embodiments, further details of which can be seen with reference to the following description and drawings.

DETAILED DESCRIPTION

The following detailed description is directed to a method, apparatus, and system for driving a solar array for tracking the movement of the sun. As discussed above, traditional solutions for driving solar arrays typically include gear trains, as well as electrical motors and corresponding motor shaft bearings that are costly to manufacture and maintain.

Utilizing the concepts and technologies described herein, a solar tracker motor provides an electro-mechanical powered solution that utilizes minimal electrical input to a system of electromagnets to precisely and accurately drive a solar array without the use of extensive gear trains, bearings, and typical electrical motor components that are subject to wear and expensive to manufacture. In the following detailed description, references are made to the accompanying drawings that form a part hereof, and which are shown by way of illustration, specific embodiments, or examples. The following disclosure and the accompanying figures describe the various embodiments in the context of a rotating solar array disk. However, it should be understood that the embodiments described herein may also be applied to any rotating disk, or may also be applied to drive linear movement of any plate, shaft, or any other apparatus that may be gripped between caliper brakes as described in detail below.

Figure 1:
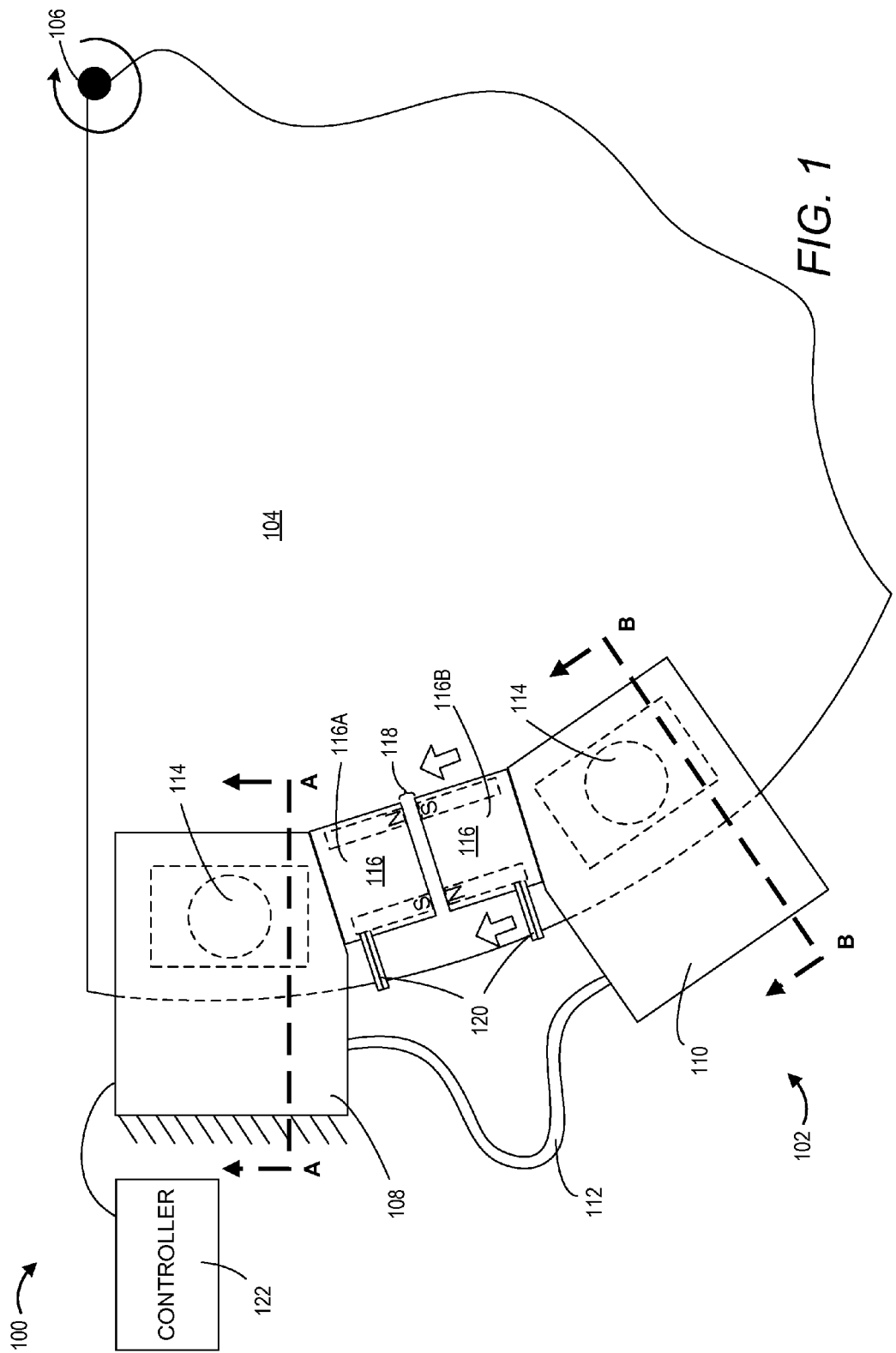
FIG. 1 is a top view of a solar tracker motor and corresponding solar array disk according to various embodiments described herein.

Referring now to the drawings, in which like numerals represent like elements through the several figures, a solar tracker motor according to the various embodiments will be described. FIG. 1 shows a top view of a solar tracker system 100. The solar tracker system 100 includes a solar tracker motor 102 and a solar array disk 104. Only a partial segment of the solar array disk 104 is shown for clarity, but the solar array disk 104 may be a circular disk to which a solar array (not shown) is mounted or connected.

It should be appreciated that the disclosure herein is not limited to driving a solar array disk 104, but that the solar array may be mounted to devices having various configurations. For example, the solar array disk 104 may be configured as an annular ring attached to the solar array. Alternatively, the solar tracker motor 102 may be one of any number of solar tracker motors connected to any number of disks, linear members, or arcuate members connected to the solar array for controlling the movement of the array. For example, the concepts described below may also apply to a fixed caliper 108 and translating caliper 110 that are configured similar to drum brakes on an automobile. In this embodiment, the brake pads associated with the fixed caliper 108 would be configured on opposing sides of the solar array disk 104, which is configured as a drum. The brake pads associated with the translating caliper 110 would also be positioned on opposing sides of the solar array disk 104, but rotated 90 degrees from the fixed caliper 108 brake pads, or offset from those brake pads by an appropriate gap width similar to the embodiments described below.

According to the embodiment shown in FIG. 1, the solar array disk 104 is rotatably connected to a shaft 106. The solar array disk may be directly welded or fastened to the shaft 106, or may be connected to the shaft via any number of spur gears, worm gears, or any other type of gears utilized for controlling the amount of solar array rotation per stroke of the solar tracker motor 102.

The solar tracker motor 102 includes a fixed caliper 108 and a translating caliper 110, connected by a flexure 112. The fixed caliper 108 is secured in place so that it does not move, while allowing the solar array disk 104 to move around a vertical azimuth axis. In contrast, the translating caliper 110 is designed to alternately move toward and away from the fixed caliper to rotate the solar array disk 104 in the direction of the large arrows and to return to a starting position, respectively. As will be described in greater detail below with respect to FIG. 2, the fixed caliper 108 and the translating caliper 110 each includes an electromagnet brake system 114 used to selectively engage and release the solar array disk 104.

Each caliper further includes a translation electromagnet 116. The translation electromagnet 116A is attached to the fixed caliper 108 and the translation electromagnet 116B is attached to the translating caliper 110. The translation electromagnets 116A and 116B are positioned a gap width 118 apart from one another when the translating caliper 110 is positioned in a starting position from which the solar array disk 104 is driven. The gap width 118 is a distance that will allow the attractive forces from opposing poles of the translation electromagnets 116, when energized, to pull the translating caliper 110 and solar array disk 104 toward the fixed caliper 108 until the translation electromagnets 116 close the gap width 118 and abut one another.

The precise distance of the gap width 118 is dependent upon a number of factors, including but not limited to, attractive strength of the translation electromagnets 116, mass of the solar tracker motor 102, mass of the solar array disk 104 and associated solar array, frictional and other characteristics of any bearings associated with the solar array disk 104 and shaft 106, as well as predicted wind loads and other environmental considerations. Preferably, the center of gravity and mass of the solar array disk 104 and solar array is balanced to minimize the required attractive forces of the translation electromagnets 116, and to therefore minimize the size, weight, and cost of the translation electromagnets 116.

The translation electromagnets 116, as well as the electromagnets described below with respect to the electromagnet brake system 114, may be of any size, shape, strength, and configuration according to the desired pull forces and gap width 118 of the solar tracker system 100. As an example, electromagnet part numbers DC-200-24C and DC-250-24C from AEC MAGNETICS were successfully tested for use with the various embodiments described herein. The translation electromagnets 116, and all other electromagnets described below, include electrical inputs 120 for receiving electricity to energize the electromagnets.

It should be understood that while the embodiments described herein utilize pairs of electromagnets that attract and/or repel one another upon receiving an electrical input, according to alternative embodiments, one magnet of any pairs of electromagnets described herein could be a permanent magnet. For example, the translation electromagnet 116A could be an electromagnet, while the corresponding translation electromagnet 116B is a permanent magnet. In this embodiment, energizing the translation electromagnet 116A would attract the permanent magnet 116B toward the translation electromagnet 116A to move the translating caliper 110 and the solar array disk 104. Similarly, one of the magnet parings of the brake systems of the fixed caliper 108 and/or the translating caliper 110 may be a permanent magnet, with the corresponding magnet being an electromagnet.

While the embodiments provided herein are described in the context of utilizing electromagnets for the engagement and disengagement of the brake systems, and for the movement of the translating caliper 110 with respect to the fixed caliper 108, it should be understood that hydraulic and/or pneumatic systems could also be used to provide the described motion without departing from the scope of this disclosure. Utilizing hydraulic or pneumatic systems instead of one or more electromagnet systems would introduce additional components into the solar tracker system 100 such as hydraulic reservoirs or air compressors, but the functionality of the fixed caliper 108 and the translating caliper 110 would remain as described herein.

Returning to FIG. 1, coordination of the electrical input to the solar tracker motor 102 is controlled by a controller 122. It should be understood that the controller 122 may be any computer or electrical hardware and/or software component that is operative to direct power to the various electromagnets of the solar tracker system 100 in a coordinated manner to selectively engage and release caliper brakes and to energize the translation electromagnets 116 for moving the translating caliper 110 and corresponding solar array disk 104 as described throughout this disclosure. For clarity, the controller 122 is only shown in FIG. 1, although it is to be understood that the controller 122 may be a part of the solar tracker system 100 shown throughout the figures. The controller 122 may be a separate computer and/or component from the solar tracker motor 102, may be a part of the solar tracker motor 102, or a combination thereof. Activation and deactivation of electrical input to the solar tracker motor 102 may occur at preprogrammed times according to computer executable instructions stored at or accessible by the controller 122 and/or may be manually triggered locally or remotely by human or computer input.

As will be described in greater detail below with respect to FIGS. 4A-8, the solar tracker motor 102 incrementally rotates the solar array disk 104 using an electromagnetic drive system that includes the electromagnet brake systems 114 of the fixed caliper 108 and the translating caliper 110, and the translation electromagnets 116. To rotate the solar array disk 104, the controller 122 disengages the electromagnet brake system 114 of the fixed caliper 108, engages the electromagnet brake system 114 of the translating caliper 110, and energizes the translation electromagnets 116. Energizing the translation electromagnets 116 induces movement of the translating caliper 110 and solar array disk 104 a distance corresponding to the gap width 118 toward the fixed caliper 108. To further rotate the solar array disk 104, the controller 122 directs the applicable electrical input to engage the electromagnet brake system 114 of the fixed caliper 108, disengage the electromagnet brake system 114 of the translating caliper 110, and de-energize the translation electromagnets 116, allowing springs (not shown) to push the translating caliper 110 away from the fixed caliper 108 to the starting position a gap width 118 away, where the process is repeated until the solar array disk 104 is rotated a desired amount.

As mentioned above, the translating caliper 110 is guided back and forth from a starting position adjacent to and a gap width apart from the fixed caliper 108, to an end position that abuts the fixed caliper 108, and then back to the starting position, using a flexure 112. The flexure 112 may be one or more spring-loaded blades that are used to hold the translating caliper 110 in position over the solar array disk 104 as it moves back and forth to rotate the array. As an alternative to the flexure 112, a fixed guide may be utilized to allow the translating caliper 110 to slide back and forth within the guide. The flexure 112 provides a benefit over a fixed guide since sliding components create material wear and fatigue and will require periodic replacement.

Figure 2:
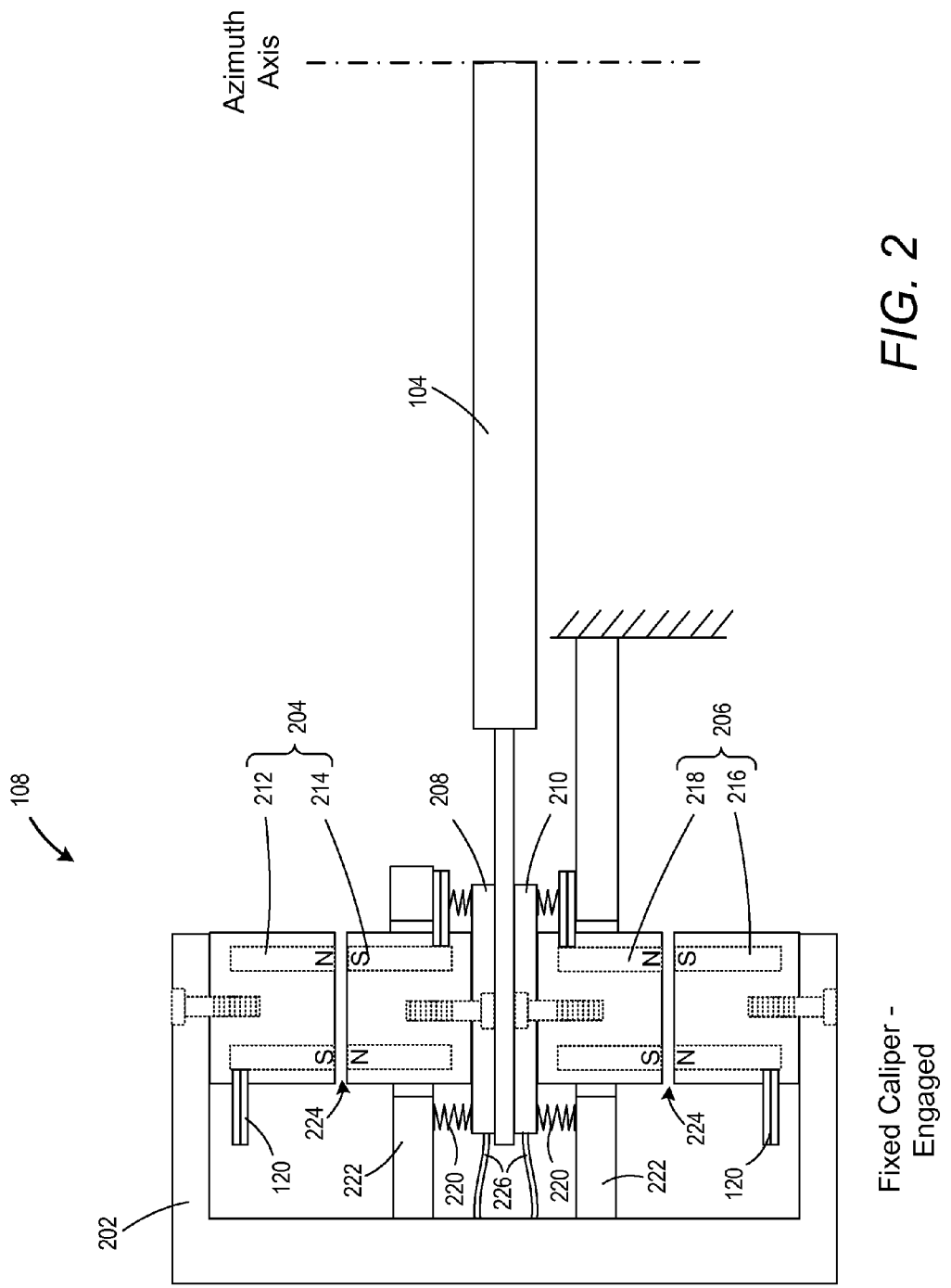
FIG. 2 is a side cross-sectional view of a fixed caliper taken along line A-A of FIG. 1 and showing engaged caliper brakes and a secured solar array disk according to various embodiments presented herein.

Turning now to FIG. 2, a cross-sectional view of the fixed caliper 108 taken along line A-A of FIG. 1 is shown. According to this example, the fixed caliper 108 is shown in an engaged configuration in which the solar array disk 104 is secured to the fixed caliper 108, such as during repositioning of the translating caliper 110 to the starting position. For clarity, the translation electromagnet 116A is not shown.

The electromagnet brake system 114 shown and described above with respect to FIG. 1 is shown in greater detail in FIG. 2. According to various embodiments, the electromagnet brake system 114 includes an upper electromagnet system 204, a lower electromagnet system 206, an upper brake pad 208, and a lower brake pad 210. It should be appreciated that the upper brake pad 208 and the lower brake pad 210, together referred to as the caliper brakes, may be manufactured from any suitable material for gripping the solar array disk 104 to prevent the disk from rotating or to drive the rotation of the disk.

The upper electromagnet system 204 includes an upper fixed electromagnet 212 and an upper moveable electromagnet 214. The upper fixed electromagnet 212 is secured to a framework 202 of the fixed caliper 108 via bolts as shown, or by any other suitable means for securing components to one another. The upper moveable electromagnet 214 is secured at one end to the upper brake pad 208, and is held in the framework 202 using springs 220 that press against a framework member 222 at one end of the springs 220, and against the upper brake pad 208 at the opposing end of the springs 220. The springs 220 are in a partially compressed configuration so that the upper moveable electromagnet 214 is biased in a downward direction when the upper electromagnet system is not energized. By pushing the upper brake pad 208 and corresponding upper moveable electromagnet 214 downward, the upper brake pad 208 engages the solar array disk 104 and a gap width 224 is create between the upper moveable electromagnet 214 and the upper fixed electromagnet 212.

The lower electromagnet system 206 is a minor image of the upper electromagnet system 204 and includes a lower fixed electromagnet 216 and a lower moveable electromagnet 218. The lower fixed electromagnet 216 is secured to the framework 202 of the fixed caliper 108 via bolts as shown, or by any other suitable means for securing components to one another. The lower moveable electromagnet 218 is secured at one end to the lower brake pad 210, and is held in the framework 202 using springs 220 that press against a framework member 222 at one end of the springs 220, and against the lower brake pad 210 at the opposing end of the springs 220.

As described above, the springs 220 bias the lower moveable electromagnet 218 in an upward direction when the lower electromagnet system 206 is not energized. With the caliper brakes engaging the solar array disk 104 when power is removed from the electromagnet brake system 114, this aspect of the disclosure provides a safety feature that locks the solar array disk 104 in place in the event of a power failure. As with the upper electromagnet system 204, biasing the lower brake pad 210 in an engaged configuration also spaces the lower moveable electromagnet 218 from the lower fixed electromagnet 216 by a gap width 224.

The fixed caliper 108 may include flexures 226 that may be similar in structure to flexures 112. However, the flexures 226 connect the brake pads 208 and 210 to the framework 202. Doing so transmits shear loads from the solar array disk 104 to the brake pads, and from the brake pads to the framework 202 via the flexures 226. The translating caliper 110 may similarly include flexures 226 for the same purpose.

As will be illustrated below in FIGS. 4A and 6B, providing power to the electromagnet brake system 114 via electrical inputs 120 will energize the upper and lower electromagnet systems, causing the upper moveable electromagnet 214 to be raised to close the gap width 224 and abut the upper fixed electromagnet 212, and similarly causing the lower moveable electromagnet 218 to be lowered to close the gap width 224 and abut the lower fixed electromagnet 216. Doing so disengages the caliper brakes and allows for solar array disk 104 movement with respect to the applicable fixed or translating caliper.

Figure 3:
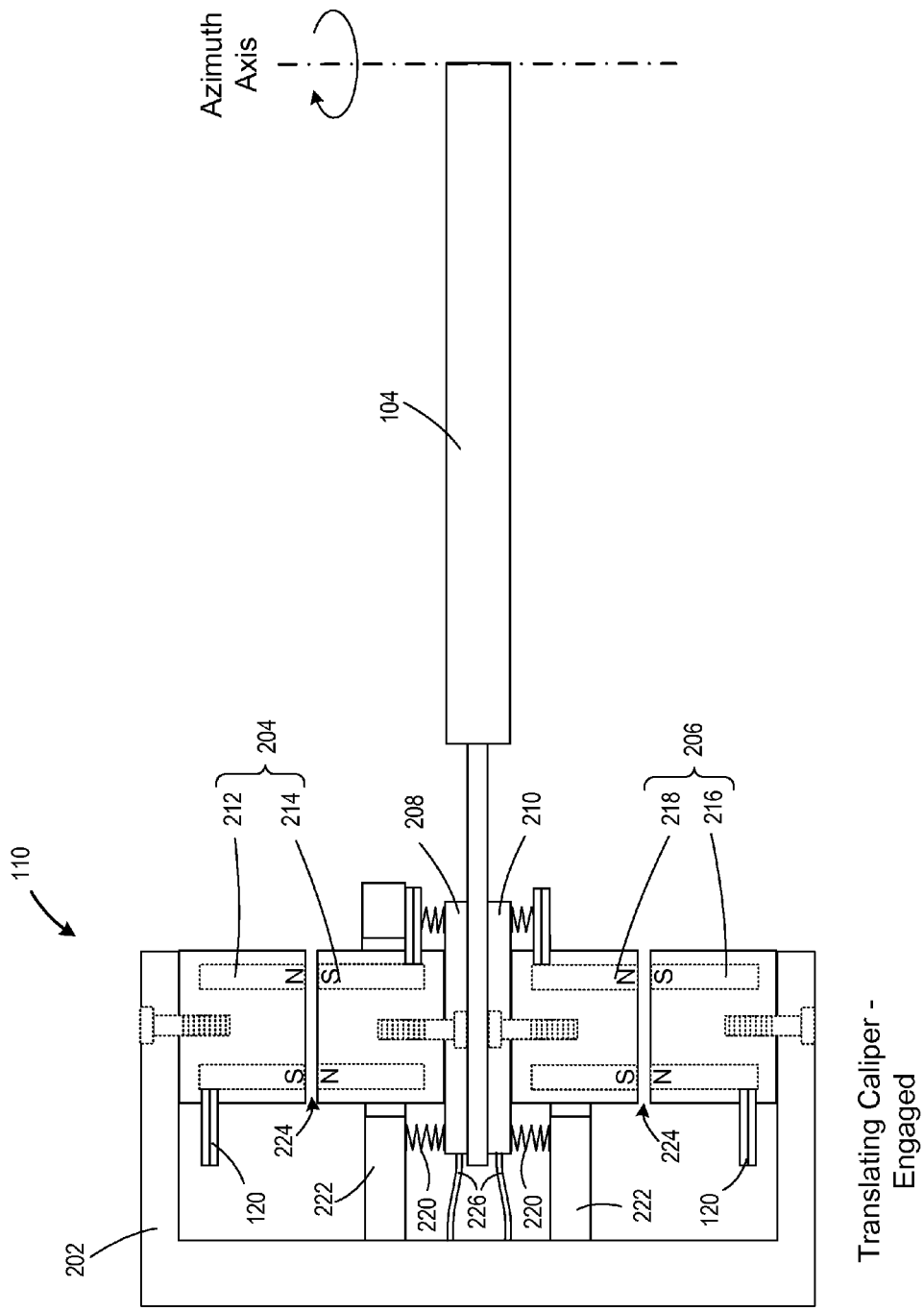
FIG. 3 is a side cross-sectional view of a translating caliper taken along line B-B of FIG. 1 and showing engaged caliper brakes and a rotating solar array disk according to various embodiments presented herein.
Figure 4:
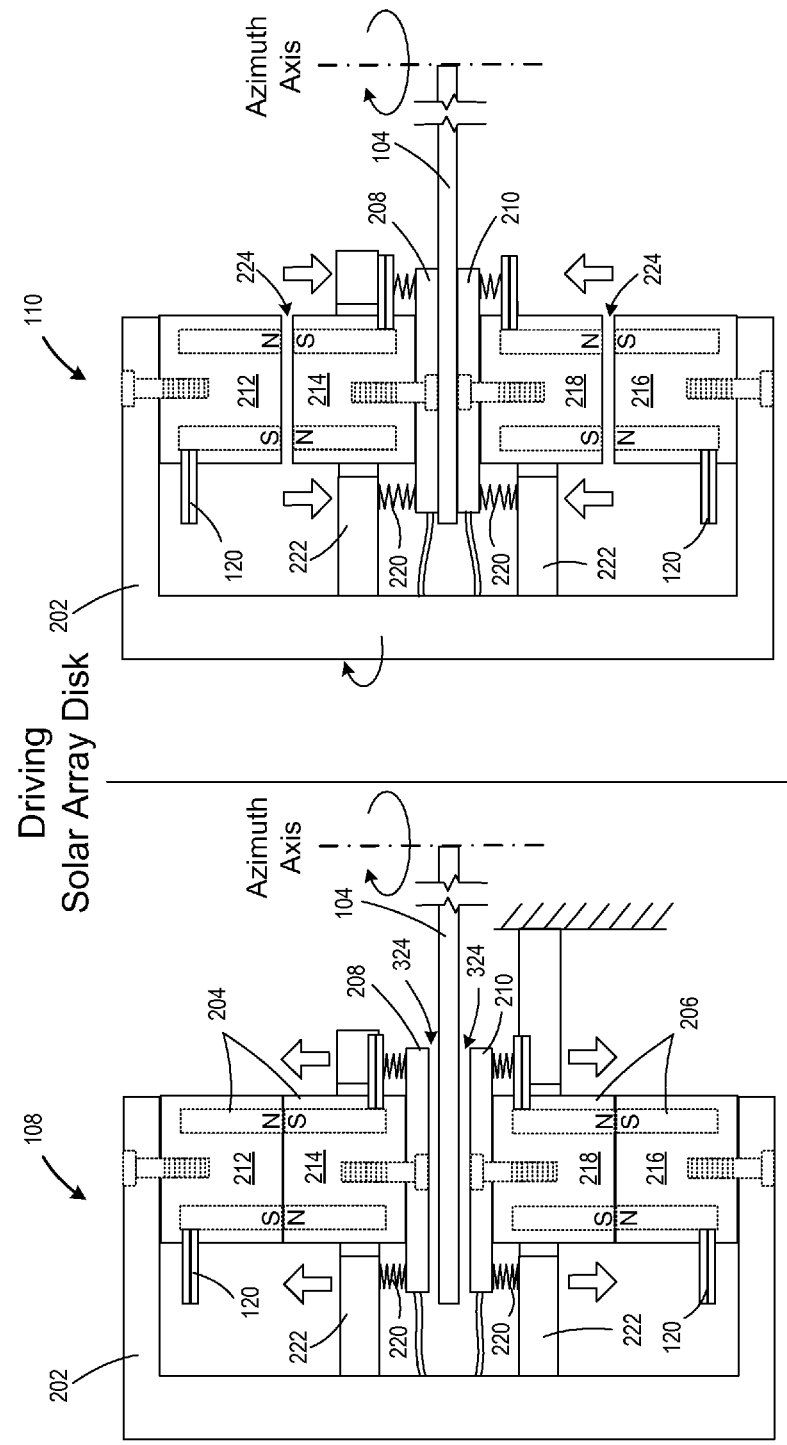
FIGS. 4A and 4B are side cross-sectional views of a fixed caliper and a translating caliper taken along lines A-A and B-B, respectively, of FIG. 1 and showing configurations of the solar tracker motor when rotating the solar array disk according to various embodiments presented herein.
Figure 5:
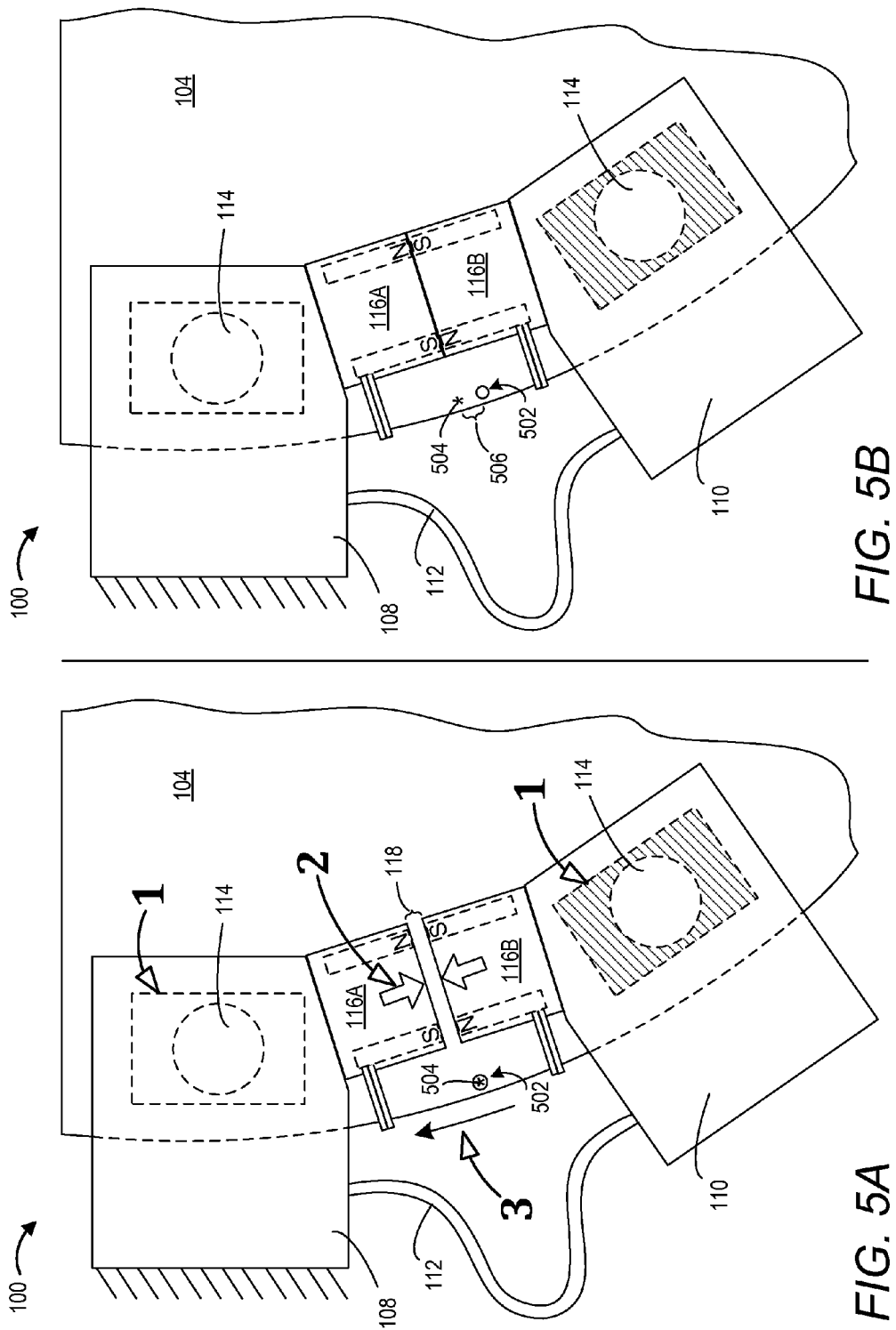
FIGS. 5A and 5B are top views of the solar tracker motor shown in FIGS. 4A and 4B, showing configurations of the solar tracker motor at a starting position and at an end position, respectively, when rotating the solar array disk according to various embodiments presented herein.

FIG. 3 shows a cross-sectional view of the translating caliper 110 taken along line B-B of FIG. 1. According to various embodiments, the components of the translating caliper 110 are substantially identical to the components of the fixed caliper 108 shown and described above. The difference lies in that the translating caliper 110 is not fixed in place via a framework member 222 or any other component of the framework 202, as is the fixed caliper 108. Rather, the translating caliper 110 is free to move linearly or rotationally within the constraints of the flexure 112. Accordingly, when the caliper brakes of the translating caliper 110 are engaged with the solar array disk 104, then the solar array disk 104 rotates with the translating caliper 110, as depicted by the arrow encircling the azimuth axis shown in FIG. 3. In contrast, because the fixed caliper 108 is secured in place, when the caliper brakes of the fixed caliper 108 are engaged with the solar array disk 104, then any movement of the solar array disk 104 is prevented.

As discussed above, according to various embodiments, the solar tracker motor 102 can be described as operating in two strokes. The first stroke is a translation stroke in which the translating caliper 110 grips the solar array disk 104 and moves inward toward the fixed caliper 108 to move the solar array disk 104. The second stroke is a repositioning stroke during which the translating caliper 110 releases the solar array disk 104 and returns outward from the fixed caliper 108 to the starting position. From the starting position, the process is repeated until the solar array disk 104 has been rotated the desired amount. FIGS. 4A-5B will be used to illustrate the translation stroke, followed by FIGS. 6A-7B, which will be used to illustrate the repositioning stroke. Looking at FIGS. 4A and 4B, the actions taken by the fixed caliper 108, shown in FIG. 4A on the left side of the drawing sheet, and the actions taken by the translating caliper 110, shown in FIG. 4B on the right side of the drawing sheet, during the translation stroke will be shown and described. To begin the translation stroke of the solar tracker motor, the controller 122 directs electricity to the electrical inputs 120 of the upper electromagnet system 204 (including electromagnets 212 and 214) and to the electrical inputs 120 of the lower electromagnet system 206 (including electromagnets 216 and 218). Doing so energizes the corresponding electromagnets, which due to the configuration of the electromagnets being adjacent to, and a gap width 224 (as seen in FIGS. 2 and 3) apart from, another electromagnet having the opposite polarity, the attractive forces of the electromagnets raises the upper moveable electromagnet 214 a distance equivalent to the gap width 224 until the upper moveable electromagnet 214 abuts the upper fixed electromagnet 212.

Similarly, the lower moveable electromagnet 218 is lowered a distance equivalent to the gap width 224 until the lower moveable electromagnet 218 abuts the lower fixed electromagnet 216. By raising the upper brake pad 208 and lowering the lower brake pad 210, the caliper brakes disengage the solar array disk 104 to create brake pad gaps 324 through which the solar array disk 104 is free to rotate. The brake pad gaps 324 are substantially equivalent to the gap widths 224 between the electromagnets of the brake systems since the gap widths 224 are being closed to open the brake pad gaps 324. FIG. 4A may be compared to FIG. 2 to illustrate the differences between the engaged configuration and disengaged configuration of the fixed caliper 108 in which the gap widths 224 are closed and the brake pad gaps 324 are created to release the solar array disk 104.

Simultaneous with or immediately following the disengagement of the fixed caliper 108 from the solar array disk 104, the caliper brakes of the translating caliper 110 are engaged with the solar array disk 104, as shown in FIG. 4B. It should be appreciated that if the translating caliper 110 was at rest prior to the start of the translation stroke, as opposed to transitioning from the repositioning stroke described below, then the brake pads 208 and 210 will already be engaged according to one embodiment, since a removal of power from the electrical inputs 120 causes the caliper brakes of both the fixed caliper 108 and the translating caliper 110 to engage the solar array disk 104 to prevent the disk from rotating. However, should the translating caliper 110 be transitioning from the repositioning stroke, then the controller 122 will remove power from the electrical inputs 120 of the translating caliper 110 to de-energize the upper electromagnet system 204 and the lower electromagnet system 206, allowing the springs 220 to push the caliper brakes against the solar array disk 104 in preparation for the translation stroke.

FIGS. 5A and 5B show top views of the solar tracker system 100 as it moves from a starting position, as shown in FIG. 5A, to an end position, as shown in FIG. 5B, during the translation stroke. Looking at FIG. 5A, the large bold numbers 1-3 with corresponding arrows are used to indicate the order of the actions taken by the solar tracking motor 102 during the translation stroke. Cross-hatching is used on an electromagnetic brake system 114 to indicate that it is engaged. Following the large bold numbers, the first action taken to initiate the translation stroke is to disengage the caliper brakes of the electromagnetic brake system 114 of the fixed caliper 108, while engaging the caliper brakes of the electromagnetic brake system 114 of the translating caliper 110. As discussed above and illustrated in FIGS. 4A and 4B, this action is performed by providing an electrical input to the appropriate fixed caliper 108 electromagnets, and discontinuing the electrical input to the appropriate translating caliper 110 electromagnets.

After disengaging the caliper brakes of the fixed caliper 108 and engaging the caliper brakes of the translating caliper 110, the second action involves the controller 122 providing an electrical input to the translation electromagnets 116A and 116B to energize the electromagnets and create the attractive force across the gap width 118. This attractive force results in the third action, which is the movement of the translating caliper 110 to the fixed caliper 108, which rotates the solar array disk 104 an amount equivalent to the gap width 118.

To further illustrate the disk rotation, FIG. 5A has been annotated with a small circle representing the starting location 502 of the translating caliper 110. That starting location 502 is fixed in space since the translating caliper 110 always returns to that location, which is a gap width 118 from the translation electromagnet 116A of the fixed caliper 108. Within that circle, a reference mark 504 (shown as a star) has been marked on the surface of the solar array disk 104. The reference mark 504 moves with the disk as it rotates. Looking at FIG. 5B, it can be seen that as the translating caliper 110 reaches the end location that abuts the translation electromagnet 116A, the reference mark 504 has moved a distance 506 from the starting location 502. As stated above, the distance 506 that the reference mark 504 moved during the translation stroke is equivalent to the gap width 118.

Figure 6:
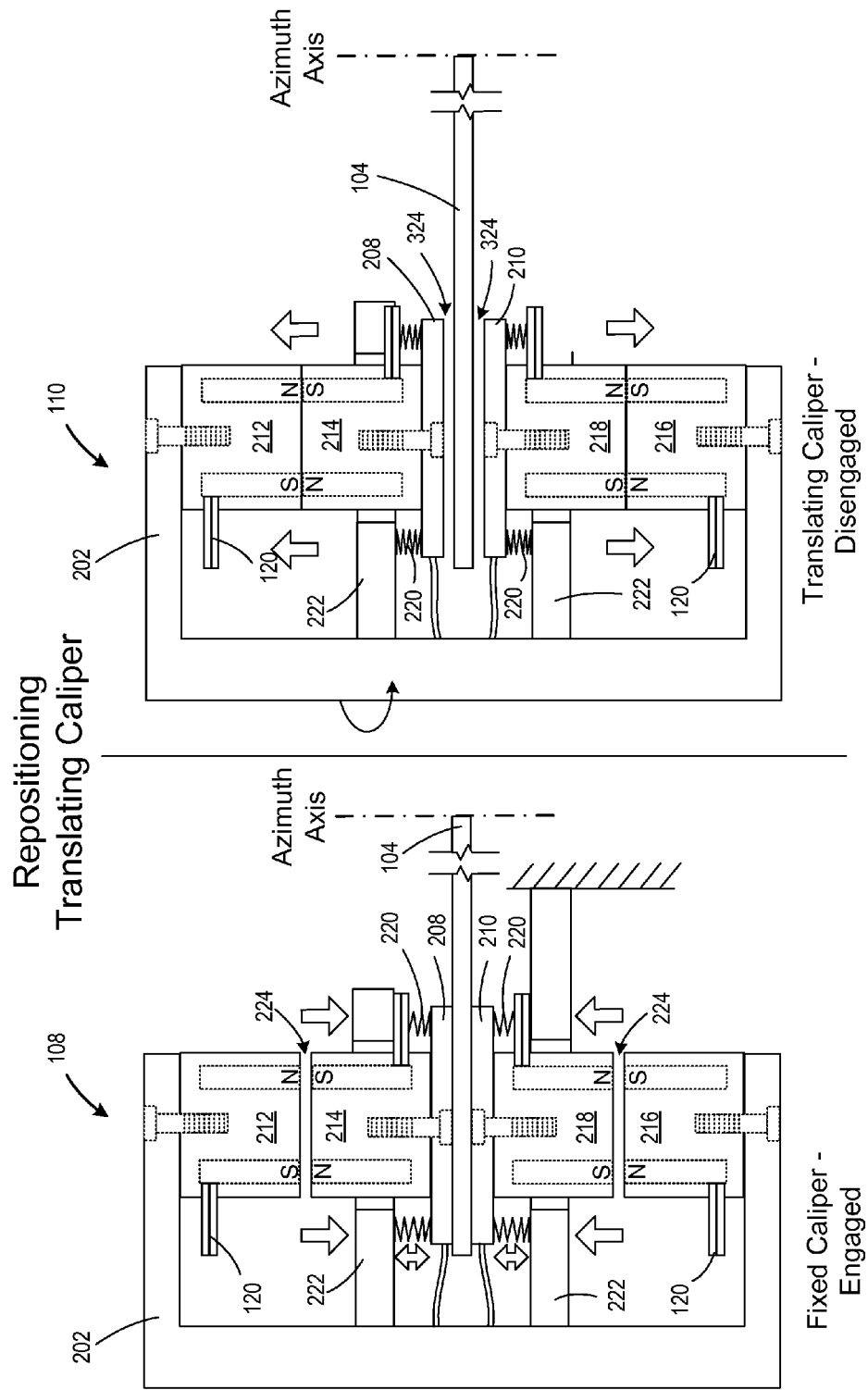
FIGS. 6A and 6B are side cross-sectional views of the fixed caliper and the translating caliper, respectively, of FIGS. 4A and 4B, showing configurations of the solar tracker motor when securing the solar array disk and repositioning the translating caliper to a starting position according to various embodiments presented herein.
Figure 7:
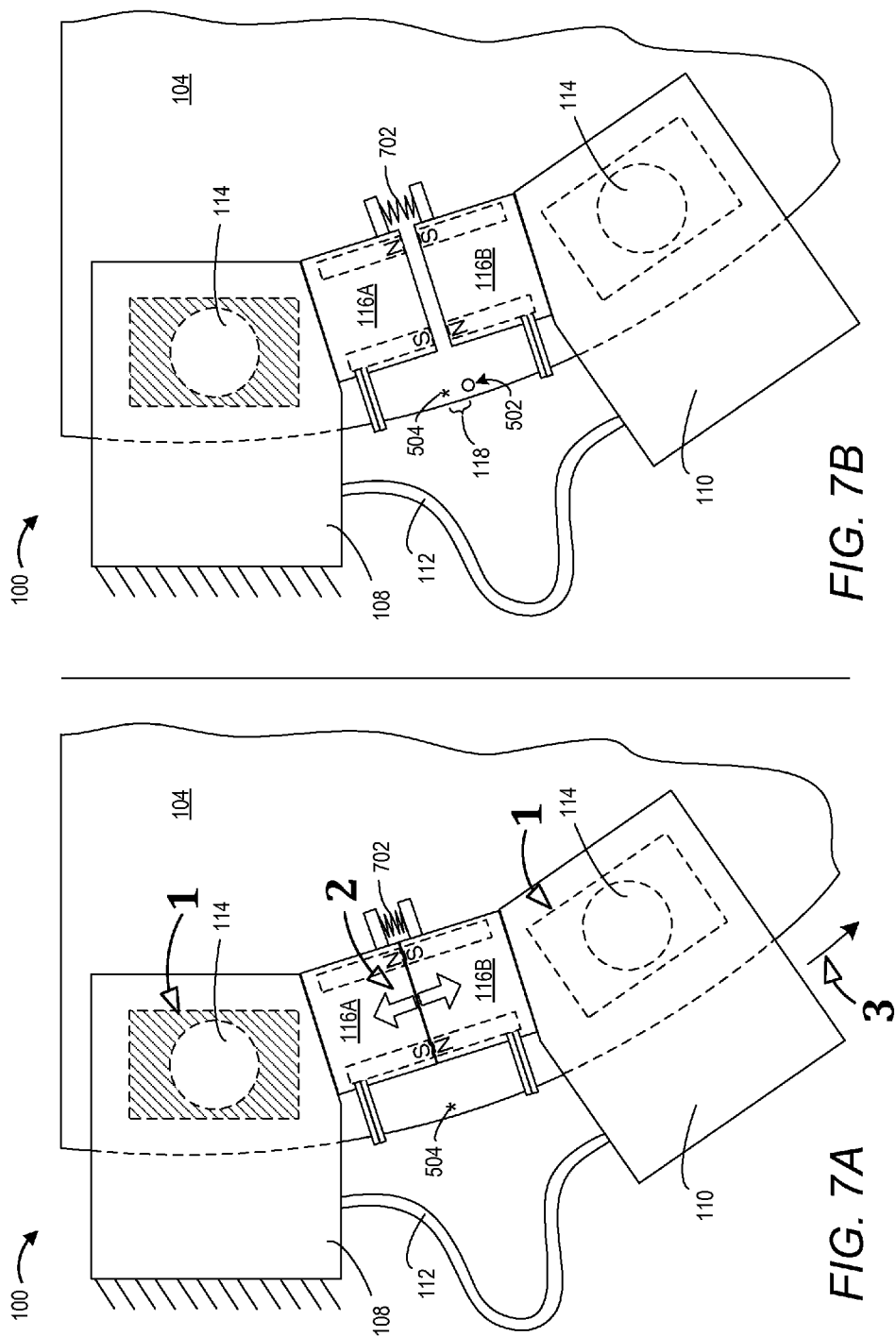
FIGS. 7A and 7B are top views of the solar tracker motor shown in FIGS. 6A and 6B, showing configurations of the solar tracker motor at the end position and at the starting position, respectively, when securing the solar array disk and repositioning the translating caliper to the starting position according to various embodiments presented herein.

Turning now to FIGS. 6A-7B, the actions taken by the fixed caliper 108 and the translating caliper 110 during the repositioning stroke will now be described. As seen in FIGS. 6A and 6B, the repositioning stroke, during which the translating caliper 110 is returned to the starting position 502 a gap width 118 away from the fixed caliper 108, is initiated by engaging the caliper brakes of the fixed caliper 108 to secure the solar array disk 104 in place, while disengaging the caliper brakes of the translating caliper 110 to free the translating caliper 110 from the solar array disk 104 for repositioning to the starting location 502. To engage the caliper brakes of the fixed caliper 108, power is removed from the applicable electromagnets, allowing the springs 220 to push the upper brake pad 208 and the lower brake pad 210 against the solar array disk 104. To disengage the caliper brakes of the translating caliper 110, power is supplied to the translating caliper 110 to attract the adjacent electromagnets and pull the upper brake pad 208 and lower brake pad 210 away from the solar array disk 104.

FIGS. 7A and 7B show top views of the solar tracker system 100 as it returns from the end position, as shown in FIG. 7A, to the starting position 502, as shown in FIG. 7B, during the repositioning stroke. Looking at FIG. 7A, the large bold numbers 1-3 with corresponding arrows are again used to indicate the order of the actions taken by the solar tracking motor 102 during the repositioning stroke. Cross-hatching is again used on an electromagnetic brake system 114 to indicate that is engaged. Following the large bold numbers, the first action taken to initiate the repositioning stroke is to engage the caliper brakes of the electromagnetic brake system 114 of the fixed caliper 108, while disengaging the caliper brakes of the electromagnetic brake system 114 of the translating caliper 110.

Next, looking at the second action, the controller 122 discontinues the electrical input to the translation electromagnets 116A and 116B to de-energize the electromagnets and destroy the attractive forces between the electromagnets. Doing so, allows spring 702 to push the translating caliper 110 away from the fixed caliper 108 to the starting position 502, as indicated by the third action. FIG. 7B shows that after repositioning the translating caliper 110 to the starting position 502, the reference mark 504 on the surface of the solar array disk 104 has stayed in place, which is a distance equivalent with the gap width 118 from the starting location 502. After the next translation stroke, the reference mark 504 will be another gap width 118 closer to the fixed caliper 108 from the position of the reference mark 504 in FIG. 7B.

It should be noted that the spring 702 is not shown in previous figures for clarity purposes. There may be one or more springs 702 positioned between the fixed caliper 108 and the translating caliper 110 and configured so that the translation stroke compresses the spring 702, and the compression force is used during the repositioning stroke after de-energizing the translation electromagnets 116 in order to return the translating caliper 110 to the starting position 502. In an alternative embodiment, instead of using the springs 220 and/or the spring 702 to push electromagnets apart after the removal of power, the electromagnets may be configured so that alternative electrical input reverses the polarity of one of adjacent electromagnets so that adjacent polarities of adjacent electromagnets are identical, resulting in a repelling force that pushes the electromagnets apart. In yet another alternative, additional electromagnets are positioned within the solar tracker motor and configured to repel one another upon the receiving an electrical input.

The embodiments shown in the figures and described above allow for the rotation of a solar array disk 104, or for the linear translation of a plate, in a single direction. If bi-direction rotation or linear translation were desirable, the concepts described herein may be applied to provide bi-directional movement. In a first embodiment, a second solar tracker motor 102 as described above may be used, but configured such that the fixed caliper 108 and the translating caliper 110 locations with respect to one another are reversed. For example, looking at FIG. 1, if the calipers were reversed so that the top caliper is moveable and the lower caliper is fixed, then the resulting solar tracker motor 102 would rotate the solar array disk 104 in a counter-clockwise direction.

Alternatively, a second translating caliper 110 could be placed on the opposite side of the fixed caliper 108 from the translating caliper 110 shown in the figures and described above. In this embodiment, the fixed caliper 108 would have a translation electromagnet 116 on opposite sides of the caliper to face the corresponding translation electromagnets 116 on each side of the fixed caliper 108. While the translating caliper 110 shown in the figures is operative to rotate the solar array disk 104 in a clockwise direction, the second translating caliper 110 located on the opposite side of the fixed caliper 108 would pull the solar array disk 104 back toward the fixed caliper 108, rotating the solar array disk 104 in a counter-clockwise direction.

In yet another alternative embodiment, in order to reverse the direction of rotation of the solar array disk 104, the process described herein could be reversed to utilized the fixed caliper 108 and the translating caliper 110 without using a second translating caliper 110. For example, to drive the solar array disk 104 counter-clockwise, with the translating caliper 110 abutting the fixed caliper 108, the brakes on the fixed caliper 108 could be released and the brakes on the translating caliper 110 engaged, followed by pushing the translating caliper 110 away from the fixed caliper 108 using the springs 702 or the translation electromagnets 116 in order to rotate the solar array disk 104. Reversing the brakes and pulling the translating caliper 110 to the fixed caliper 108 would reposition the translating caliper 110 for another rotation of the solar array disk 104.

It should also be appreciated that any number of solar tracker motors 102 may be utilized to rotate a solar array around any number of axes. For example, the solar tracker motor 102 shown in the figures and described above may be utilized to rotate a solar array mounted to an azimuth disk around the azimuth axis. An elevation disk may be mounted perpendicular to the azimuth disk and include an additional solar tracker motor 102 to rotate the solar array around an elevation axis.

Figure 8:
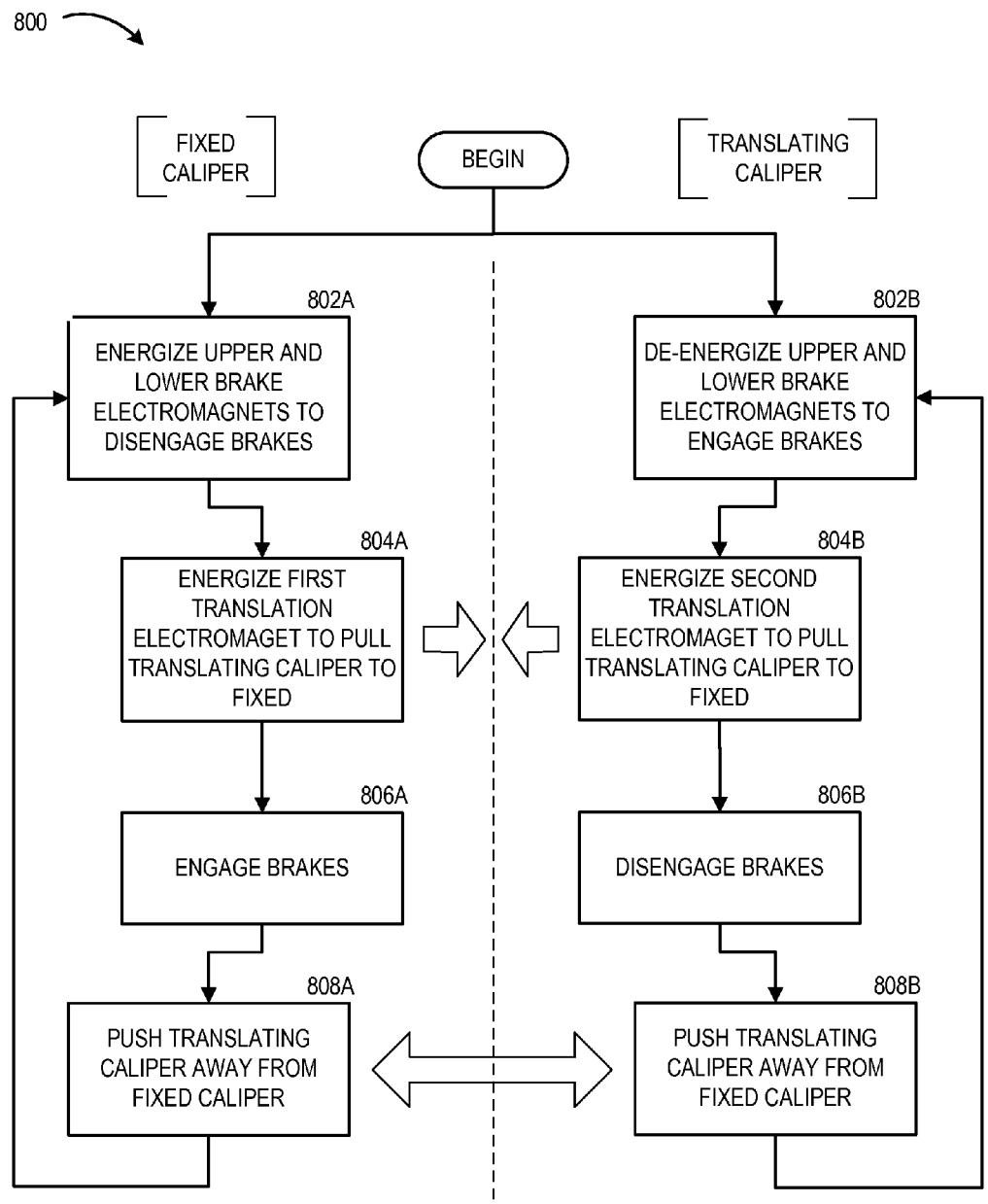
FIG. 8 is a flow diagram showing a method for rotating a solar array disk according to various embodiments presented herein.

Turning now to FIG. 8, an illustrative routine 800 for rotating a solar array disk 104 will now be described in detail. It should be appreciated that more or fewer operations may be performed than shown in the figures and described herein. These operations may also be performed in a different order than those described herein. The routine 800 is shown with operations associated with the fixed caliper 108 on the left side of the broken line, and with operations associated with the translating caliper 110 on the right side of the broken line. Each corresponding "A" and "B" operation may occur simultaneously or in succession with one another with either operation occurring first.

The routine 800 begins at operation 802A, where the controller 122 provides power to the upper electromagnet system 204 and lower electromagnet system 206 of the fixed caliper 108 to release the caliper brakes from the solar array disk 104. At the same time or shortly before or after, at operation 802B, the controller 122 removes power from the upper electromagnet system 204 and lower electromagnet system 206 of the translating caliper 110 to engage the caliper brakes and grip the solar array disk 104 with the translating caliper 110. From operations 802A and 802B, the routine 800 continues to operations 804A and 804B, where the translation electromagnets 116A and 116B are energized to pull the translating caliper 110 a distance equivalent to the gap width 118 toward the fixed caliper 108 to complete the translation stroke of the solar tracker motor cycle.

At operations 806A and 806B, the controller removes power from the fixed caliper 108 to engage the corresponding caliper brakes and secure the solar array disk 104 in place, and also provides the appropriate electrical input to the translating caliper 110 to disengage the corresponding caliper brakes to prepare for repositioning the translating caliper 110 back to the starting position 502. At operations 808A and 808B, the release of the caliper brakes of the translating caliper 110 allows the spring 702 to push the translating caliper 110 away from the fixed caliper 108 to the starting position 502. Alternatively, the controller 122 may provide appropriate electrical input to repelling electromagnets as discussed above in order to reposition the translating caliper 110. When the translating caliper 110 is back in the starting position 502, the routine 800 returns to operations 802A and 802B and then continues until the desired rotation has been completed.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A method for driving a solar array disk, the method comprising:
    disengaging a brake system of a fixed caliper from the solar array disk;
    engaging a brake system of a translating caliper with the solar array disk; and
    moving the translating caliper from a starting position toward or away from the fixed caliper to an end position such that the engaged brake system moves the solar array disk with the translating caliper.

2. The method of claim 1, further comprising:
    engaging the brake system of the fixed caliper with the solar array disk;
    disengaging the brake system of the translating caliper from the solar array disk; and
    moving the translating caliper from the end position toward or away from the fixed caliper back to the starting position such that the solar array disk remains stationary with the fixed caliper as the translating caliper returns to the starting position.

3. The method of claim 2, further comprising:
    disengaging the brake system of the fixed caliper from the solar array disk;
    re-engaging the brake system of the translating caliper with the solar array disk; and
    moving the translating caliper from the starting position toward or away from the fixed caliper to the end position.

4. The method of claim 1, wherein engaging the brake system of the translating caliper with the solar array disk comprises de-energizing a plurality of electromagnets holding a plurality of brake pads away from opposing surfaces of the solar array disk, and applying a spring force to the plurality of brake pads to apply pressure to the plurality of brake pads against the opposing surfaces of the solar array disk.

5. The method of claim 1, wherein engaging the brake system of the translating caliper with the solar array disk comprises energizing a plurality of electromagnets to create duplicate adjacent polarities in the plurality of electromagnets, forcing the plurality of electromagnets apart and applying pressure to a plurality of corresponding brake pads against opposing surfaces of the solar array disk.

6. The method of claim 1, wherein disengaging the brake system of the fixed caliper comprises energizing a plurality of electromagnets to attract the electromagnets to one another, pulling a plurality of brake pads connected to a plurality of electromagnets away from opposing surfaces of the solar array disk.

7. The method of claim 1, wherein moving the translating caliper from the starting position toward or away from the fixed caliper to the end position comprises energizing a first translation electromagnet connected to the fixed caliper and a second translation electromagnet connected to the translating caliper, wherein the first and second translation electromagnets are spaced apart a predetermined distance in the starting position and are configured with opposite polarity to attract each other when energized such that the first and second translation electromagnets abut one another in the end position.

8. The method of claim 1, wherein moving the translating caliper from the starting position toward or away from the fixed caliper to the end position comprises energizing a first translation electromagnet connected to the fixed caliper and a second translation electromagnet connected to the translating caliper, wherein the first and second translation electromagnets abut one another in the starting position and are configured with duplicate polarity to repel each other when energized such that the first and second translation electromagnets are spaced apart a predetermined distance in the end position.

9. The method of claim 1, further comprising guiding the translating caliper between the starting position and the end position using a flexure connecting the fixed caliper and the translating caliper.

10. The method of claim 1, further comprising:
    removing all electrical input from the fixed caliper and the translating caliper; and
    in response to removing all electrical input, engaging the brake system of the fixed caliper and engaging the brake system of the translating caliper.

11. A solar tracker motor for rotating a solar array disk, comprising:
    a fixed caliper comprising a first electromagnet brake system and a first translation electromagnet;
    a translating caliper comprising a second electromagnet brake system and a second translation electromagnet, wherein the translating caliper is movably positioned adjacent to the fixed caliper such that the first and second translation electromagnets are spaced a gap width apart when the translating caliper is positioned in a starting position; and
    an electromagnetic drive system comprising the first and second electromagnet brake systems and the first and second translation electromagnets, wherein the electromagnetic drive system is operative to engage the solar array disk with the second electromagnet brake system in the starting position, to rotate the solar array disk the gap width toward the fixed caliper to an end position, to disengage the solar array disk with the second electromagnet brake system, to engage the solar array disk with the first electromagnet brake system, and to return the translating caliper to the starting position.

12. The solar tracker motor of claim 11, wherein each of the first and second electromagnet brake systems comprise:
    caliper brakes comprising an upper brake pad and a lower brake pad configured to apply pressure to opposing sides of the solar array disk to secure the solar array disk to the fixed caliper or to the translating caliper, an upper electromagnet system comprising an upper fixed electromagnet and an upper moveable electromagnet, wherein the upper moveable electromagnet is attached to the upper brake pad and in response to receiving electrical input to the upper electromagnet system, is configured to raise the lower brake pad away from the solar array disk, a lower electromagnet system comprising a lower fixed electromagnet and a lower moveable electromagnet, wherein the lower moveable electromagnet is attached to the lower brake pad and in response to receiving electrical input to the lower electromagnet system, is configured to lower the lower brake pad away from the solar array disk to disengage the caliper brakes and allow solar array disk movement in relation to the fixed caliper or the translating caliper.

13. The solar tracker motor of claim 12, wherein each of the first and second electromagnet brake systems further comprise a plurality of springs configured to apply pressure to the caliper brakes to engage the solar array disk when electrical input is removed from the upper and lower electromagnet systems.

14. The solar tracker motor of claim 11, further comprising at least one spring connected at one end to the fixed caliper and at an opposing end to the translating caliper such that the at least one spring is under compression when the translating caliper is positioned at the end position, and wherein the at least one spring is configured to push the translating caliper away from the fixed caliper to return the translating caliper to the starting position when electrical input is removed from the first and second translation electromagnets.

15. The solar tracker motor of claim 11, further comprising a second fixed caliper and a second translating caliper, wherein the solar array disk comprises an azimuth disk and an elevation disk such that the fixed caliper and the translating caliper are operative to rotate the azimuth disk around an azimuth axis, and such that the second fixed caliper and the second translating caliper are operative to rotate the elevation disk around an elevation axis.

16. The solar tracker motor of claim 15, further comprising a controller operative to control the electromagnetic drive system to incrementally rotate and elevate the solar array disk at a rate and amount that tracks movement of the sun.

17. The solar tracker motor of claim 11, further comprising a flexure connecting the fixed caliper to the translating caliper and configured to guide the translating caliper between the starting position and the end position.

18. A solar tracking system, comprising:
a solar array comprising a disk configured to rotate around an azimuth axis and an elevation axis to track the sun;
a fixed caliper and a translating caliper, wherein each of the fixed caliper and the translating caliper comprises an upper electromagnet system, a lower electromagnet system, and a translation electromagnet,
wherein the upper electromagnet system comprises an upper brake pad, an upper moveable electromagnet, and an upper fixed electromagnet, wherein the upper moveable electromagnet is attached to the upper brake pad and in response to receiving electrical input to the upper electromagnet system, is configured to raise the upper brake pad away from the disk,
wherein the lower electromagnet system comprises a lower brake pad, a lower moveable electromagnet, and a lower fixed electromagnet, wherein the lower moveable electromagnet is attached to the lower brake pad and in response to receiving electrical input to the lower electromagnet system, is configured to lower the lower brake pad away from the disk to disengage the caliper brakes and allow disk movement in relation to the fixed caliper or the translating caliper, and
wherein the translation electromagnet attached to the translating caliper is positioned a gap width apart from the translation electromagnet attached to the fixed caliper and is pulled toward the fixed caliper in response to receiving electrical input; and
a controller operative to control electrical input to the fixed caliper and to the translating caliper to rotate the disk.

19. The solar tracking system of claim 18, wherein the controller being operative to control electrical input to the fixed caliper and to the translating caliper to rotate the disk comprises the controller being operative to control electrical input to the fixed caliper and to the translating caliper to disengage the upper brake pad and the lower brake pad of the fixed caliper while engaging the upper brake pad and the lower brake pad of the translating caliper and providing electrical input to each translation electromagnet to rotate the disk a distance defined by a gap width between the translation electromagnets when positioned in a starting position.

20. The solar tracking system of claim 19, wherein the controller is further operative to control electrical input to the fixed caliper and to the translating caliper to engage the upper brake pad and the lower brake pad of the fixed caliper while disengaging the upper brake pad and the lower brake pad of the translating caliper and removing electrical input from each translation electromagnet to return the translating caliper to the starting position while the disk is stationary.

* * * * *